US009172120B2

(12) United States Patent
Pariseau et al.

(10) Patent No.: US 9,172,120 B2
(45) Date of Patent: Oct. 27, 2015

(54) BATTERY PACK FAULT COMMUNICATION AND HANDLING

(75) Inventors: David Kevin Pariseau, Los Altos, CA (US); Yang Wang, Palo Alto, CA (US); Michael Keith Collins, Cupertino, CA (US); Peng Zhou, El Cerrito, CA (US)

(73) Assignee: SINOELECTRIC POWERTRAIN CORPORATION, Sunnyvale, CA (US)

( * ) Notice: Subject to any disclaimer, the term of this patent is extended or adjusted under 35 U.S.C. 154(b) by 1255 days.

(21) Appl. No.: 12/938,255

(22) Filed: Nov. 2, 2010

(65) Prior Publication Data

US 2012/0013201 A1    Jan. 19, 2012

Related U.S. Application Data

(60) Provisional application No. 61/364,313, filed on Jul. 14, 2010.

(51) Int. Cl.
*H02J 7/00*    (2006.01)
*H01M 10/48*    (2006.01)

(52) U.S. Cl.
CPC .............. *H01M 10/48* (2013.01); *H02J 7/0029* (2013.01); *H02J 2007/0098* (2013.01); *Y10T 307/826* (2015.04)

(58) Field of Classification Search
CPC ................ H02J 7/0036; H02J 7/0031; H01M 2010/4271; B60L 3/04
USPC ......................................................... 307/150
See application file for complete search history.

(56) References Cited

U.S. PATENT DOCUMENTS

| | | | |
|---|---|---|---|
| 2,258,221 | A | 10/1941 | Rochow |
| 4,135,593 | A | 1/1979 | Fowkes |
| 4,652,964 | A | 3/1987 | Zigenbein |
| 4,862,243 | A | 8/1989 | Welch et al. |

(Continued)

FOREIGN PATENT DOCUMENTS

| | | |
|---|---|---|
| CN | 1767455 A | 5/2006 |
| CN | 1313831 C | 5/2007 |

(Continued)

OTHER PUBLICATIONS

Article from Tyco Electronics that was published Apr. 14, 2008, entitled "Polymeric Positive Temperature Coefficient". Retrieved form the Internet<http://tycoelectronics.custhelp.com/. 1 page.

(Continued)

*Primary Examiner* — Fritz M Fleming

(57) ABSTRACT

A method of handling a fault in a battery pack, the method comprising: a battery module supplying a voltage to a high-voltage circuit; a battery management system transmitting a heartbeat signal to the battery module via a fault bus; the battery module preventing the heartbeat signal from being transmitted back to the battery management system in response to the battery module detecting a critical condition; and the battery management system shutting off the supply of voltage from the battery module to the high-voltage circuit in response to the battery module preventing the heartbeat signal from being transmitted back to the battery management system. The battery module transmits battery data to the battery management system via a communication bus, which is distinct from the fault bus, and the battery management system transmits one or more commands to the battery module via the communication bus.

44 Claims, 7 Drawing Sheets

(56) References Cited

U.S. PATENT DOCUMENTS

| | | | |
|---|---|---|---|
| 5,059,895 A | 10/1991 | Caraldi et al. | |
| 5,158,841 A | 10/1992 | Mennicke et al. | |
| 5,207,276 A | 5/1993 | Scofield | |
| 5,227,259 A | 7/1993 | Weaver et al. | |
| 5,534,579 A | 7/1996 | Nikaya et al. | |
| 5,542,488 A | 8/1996 | Nixon | |
| 5,608,304 A | 3/1997 | Okumura | |
| 5,624,003 A | 4/1997 | Matsuki et al. | |
| 5,670,861 A | 9/1997 | Nor | |
| 5,767,659 A | 6/1998 | Farley | |
| 5,806,618 A | 9/1998 | Luode | |
| 5,815,824 A | 9/1998 | Saga et al. | |
| 5,834,132 A | 11/1998 | Hasegawa et al. | |
| 5,861,610 A | 1/1999 | Weiss | |
| 5,903,154 A | 5/1999 | Zhang et al. | |
| 5,929,741 A | 7/1999 | Nishimura et al. | |
| 5,948,298 A | 9/1999 | Ijaz | |
| 6,132,896 A | 10/2000 | Sunderland et al. | |
| 6,337,559 B1 | 1/2002 | Sato | |
| 6,444,350 B1 | 9/2002 | Toya et al. | |
| 6,531,846 B1 | 3/2003 | Smith | |
| 6,631,775 B1 | 10/2003 | Chaney | |
| 6,747,437 B2 | 6/2004 | Chiu | |
| 7,084,361 B1 * | 8/2006 | Bowes et al. | 200/16 R |
| 7,262,605 B2 | 8/2007 | Seo et al. | |
| 7,270,910 B2 | 9/2007 | Yahnker et al. | |
| 7,507,500 B2 | 3/2009 | Donnelly et al. | |
| 7,508,171 B2 | 3/2009 | Carrier et al. | |
| 7,520,355 B2 | 4/2009 | Chaney | |
| 7,586,722 B2 * | 9/2009 | Scholer et al. | 361/88 |
| 7,667,432 B2 | 2/2010 | West et al. | |
| 7,675,263 B2 | 3/2010 | Kawasumi et al. | |
| 7,923,967 B2 | 4/2011 | Hamaguchi et al. | |
| 7,952,330 B2 | 5/2011 | Mori | |
| 8,004,244 B2 | 8/2011 | Cromer et al. | |
| 8,058,846 B2 | 11/2011 | Kim | |
| 8,198,975 B2 | 6/2012 | Sha et al. | |
| 8,203,312 B2 | 6/2012 | Yoshikawa | |
| 8,861,337 B2 * | 10/2014 | Martin et al. | 370/222 |
| 2002/0188387 A1 | 12/2002 | Woestman et al. | |
| 2003/0090855 A1 | 5/2003 | Chu et al. | |
| 2003/0205421 A1 | 11/2003 | Allen et al. | |
| 2004/0018417 A1 | 1/2004 | Stack | |
| 2005/0069773 A1 | 3/2005 | Nakai | |
| 2005/0089750 A1 | 4/2005 | Ng et al. | |
| 2007/0054178 A1 | 3/2007 | Moon et al. | |
| 2007/0089442 A1 | 4/2007 | Tsuchiya | |
| 2007/0188147 A1 | 8/2007 | Straubel et al. | |
| 2008/0053716 A1 | 3/2008 | Scheucher | |
| 2008/0096072 A1 | 4/2008 | Fukusako et al. | |
| 2008/0230288 A1 | 9/2008 | Shiomi et al. | |
| 2008/0275600 A1 | 11/2008 | Rask et al. | |
| 2008/0290080 A1 | 11/2008 | Weiss | |
| 2009/0041992 A1 | 2/2009 | Umeda et al. | |
| 2009/0123814 A1 | 5/2009 | Cabot et al. | |
| 2010/0021802 A1 | 1/2010 | Yang et al. | |
| 2010/0136392 A1 | 6/2010 | Pulliam et al. | |
| 2010/0291418 A1 | 11/2010 | Zhou et al. | |
| 2010/0291419 A1 | 11/2010 | Zhou | |
| 2010/0291426 A1 | 11/2010 | Zhou | |
| 2010/0291427 A1 | 11/2010 | Zhou | |
| 2011/0050175 A1 | 3/2011 | Odaohhara et al. | |
| 2011/0161024 A1 * | 6/2011 | Sim et al. | 702/63 |
| 2011/0248684 A1 | 10/2011 | Zhou | |
| 2011/0260755 A1 * | 10/2011 | Littow | 327/58 |
| 2012/0064378 A1 * | 3/2012 | Wang et al. | 429/7 |
| 2012/0181988 A1 | 7/2012 | Uchibori | |
| 2013/0293251 A1 * | 11/2013 | Martin et al. | 324/750.3 |
| 2014/0292346 A1 * | 10/2014 | Arnold et al. | 324/503 |

FOREIGN PATENT DOCUMENTS

| | | |
|---|---|---|
| EP | 2489541 A1 * | 8/2012 |
| JP | 2005-283516 A | 10/2005 |
| JP | 2008288046 A | 11/2008 |
| JP | 2011171255 A | 1/2011 |
| WO | 2005086196 A1 | 9/2005 |

OTHER PUBLICATIONS

International Search Report, mail date Jun. 30, 2011, International Application No. PCT/US2011/031634, 6 pages.

* cited by examiner

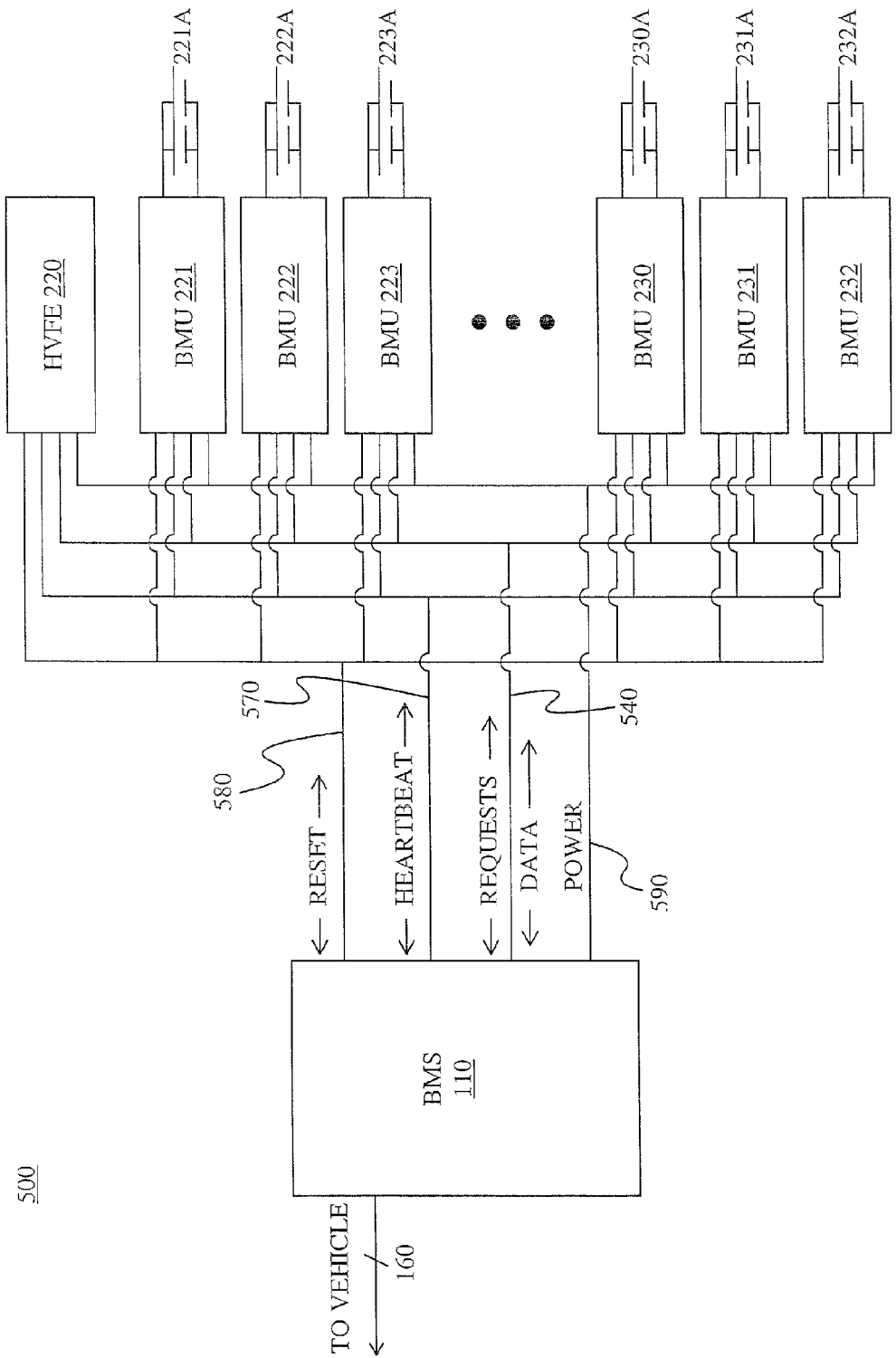

BATTERY PACK FAULT COMMUNICATION AND HANDLING

CROSS-REFERENCE TO RELATED APPLICATIONS

This application claims priority to U.S. Provisional Patent Application Ser. No. 61/364,313, filed Jul. 14, 2010 and entitled "BATTERY MONITOR SYSTEM FOR AN ELECTRIC VEHICLE," which is hereby incorporated by reference in its entirety as if set forth herein.

FIELD OF THE INVENTION

The present invention relates to managing batteries for electric vehicles. More specifically, the present invention relates to fault communication and handling for a battery pack.

BACKGROUND OF THE INVENTION

For a multitude of reasons, it is advantageous to use electric vehicles having rechargeable batteries rather than vehicles using internal combustion engines. Electric vehicles are inherently more efficient, meaning more energy is used in locomotion than lost to heat than in conventional internal combustion engines. Also, electric vehicles do not exhaust any byproducts. However, the use of electric vehicles presents technical challenges. For example, the batteries in an electric vehicle must be monitored and managed. Electric vehicle having modular batteries can be particularly challenging, as they have multiple batteries or battery packs that must be monitored and managed. Monitoring can include measurement and reporting of an individual battery's remaining charge, rate of discharge, rate of charge, temperature, and operational state. Management of the batteries can include disconnecting the battery, connecting the battery, or the like.

Battery monitoring systems in current vehicles are generally complex computer systems. Current solutions employ microprocessors executing an operating system. Such systems are inherently complex and require dedicated software systems that must be made sufficiently robust since a failure of the battery monitoring system may cause the electric vehicle to stop functioning. Therefore, significant time and effort must be placed into software and operating system development for battery monitor systems. As a result, product cycle time and cost are greatly increased.

SUMMARY OF THE INVENTION

The present invention introduces a heartbeat signal that is transmitted from a Battery-Management-System (BMS) to a battery module and back to the BMS via a fault bus. The battery module supplies a voltage to a high-voltage circuit, such as that of a vehicle. If a critical issue arises in the battery module, such as over-charging a battery cell, over-discharging a battery cell, an isolation fault, a short-circuit, over-current, over-temperature, or over-power, then the battery module terminates the heartbeat signal, thereby preventing the BMS from receiving it. In response to not receiving the heartbeat signal, the BMS automatically shuts down the high-voltage circuit, preferably without the need or use of any software or a complex operating system.

In one aspect of the present invention, a battery pack fault communication and handling system is provided. The system comprises a battery module, a fault bus, and a BMS coupled to the battery module via the fault bus. The battery module comprises at least one battery, and is configured to supply a voltage to a high-voltage circuit. The BMS is configured to transmit a heartbeat signal to the battery module via the fault bus and to receive the heartbeat signal back from the battery module via the fault bus. The BMS is also configured to shut off the supply of voltage from the battery module to the high-voltage circuit in response to the battery module preventing the BMS from receiving the heartbeat signal. In some embodiments, the high-voltage circuit is incorporated into a vehicle.

In some embodiments, the battery module, the fault bus, and the BMS form a loop. The BMS and the battery module are configured to pass the heartbeat signal through the loop. The battery module is configured to prevent the heartbeat signal from returning to the BMS in response to detection of a critical condition. In some embodiments, the critical condition comprises one of over-charging a battery cell, over-discharging a battery cell, an isolation fault, a short-circuit, over-current, over-temperature, or over-power. In some embodiments, the battery module is configured to prevent the heartbeat signal from returning to the BMS using an open-collector, an open-drain transistor, a diode, or a relay.

In some embodiments, the system further comprises a communication bus distinct from the fault bus. The BMS is coupled to the battery module via the communication bus. The battery module is configured to transmit battery data to the BMS via the communication bus, and the BMS is configured to transmit one or more commands to the battery module via the communication bus.

In some embodiments, the communication bus is a Controller-Area-Network (CAN) bus. In some embodiments, the battery data comprises information related to at least one battery's remaining charge, rate of discharge, rate of charge, temperature, maximum cell-voltage, minimum cell-voltage, current state-of-charge, or current state-of-health. In some embodiments, the commands from the BMS comprise a command for the battery module to open or close a contactor for at least one battery. In some embodiments, the BMS is configured to ping the battery module via the communication bus in response to the battery module preventing the BMS from receiving the heartbeat signal. In some embodiments, the battery module comprises a plurality of battery stacks, a plurality of Battery-Monitoring-Units (BMUs), and a High-Voltage-Front-End (HVFE) unit. Each battery stack comprises a plurality of batteries configured to supply a voltage to the high-voltage circuit. Each BMU corresponds to and is coupled to a distinct battery stack in the plurality of battery stacks, and each BMU is configured to monitor data about the plurality of batteries in the corresponding battery stack. The HVFE unit is coupled to the plurality of BMUs and configured to receive and process the data about the entire battery stack.

In another aspect of the present invention, a battery pack fault communication and handling system is provided. The system comprises a plurality of battery stacks, a plurality of BMUs, a communication bus, a fault bus distinct from the communication bus, and a BMS. Each battery stack comprises a plurality of batteries configured to supply a voltage to a high-voltage circuit. Each BMU corresponds to and is coupled to a distinct battery stack in the plurality of battery stacks, and each BMU is configured to monitor data about the plurality of batteries in the corresponding battery stack. The BMS is coupled to the plurality of BMUs via the communication bus and via the fault bus. The BMS is configured to receive battery data from the plurality of BMUs and to send one or more commands to the plurality of BMUs via the communication bus. The BMS is also configured to send a heartbeat signal to the plurality of BMUs via the fault bus and to receive the heartbeat signal back from the BMUs via the fault bus. The BMS is further configured to shut off the supply of voltage from the battery stacks to the high-voltage circuit in response to one of BMUs preventing the BMS from receiving the heartbeat signal.

In some embodiments, the data about the plurality of batteries includes at least one of current, voltage, temperature, maximum cell-voltage, minimum cell-voltage, current state-of-charge, or current state-of-health. In some embodiments, the system further comprises a HVFE unit coupled to the BMS and to the plurality of BMUs. The HVFE unit is configured to receive the data about the plurality of batteries from each BMU and to process the received data. In some embodiments, HVFE unit is configured to process the received data to produce calculated battery information, and to transmit the calculated battery information to the BMS. In some embodiments, the plurality of BMUs, the HVFE unit, the fault bus, and the BMS form a loop. In some embodiments, the BMS, the HVFE, and the BMUs are configured to pass the heartbeat signal through the loop, and the plurality of BMUs is configured to prevent the heartbeat signal from returning to the BMS in response to detection of a critical condition. In some embodiments, the critical condition comprises one of overcharging a battery cell, over-discharging a battery cell, an isolation fault, a short-circuit, over-current, over-temperature, or over-power. In some embodiments, the plurality of BMUs is configured to prevent the heartbeat signal from returning to the BMS using an open-collector, an open-drain transistor, a diode, or a relay.

In some embodiments, the communication bus is a CAN-bus. In some embodiments, the one or more commands comprises a command to open or close a contactor for at least one of the batteries. In some embodiments, the BMS is configured to ping the BMUs via the communication bus in response to one of BMUs preventing the BMS from receiving the heartbeat signal.

In some embodiments, the system further comprises a reset bus coupled between the BMS and the plurality of BMUs. The reset bus is distinct from the communication bus, and the BMS is configured to perform a hardware reset on all of the BMUs via the reset bus. In some embodiments, the BMS is configured to perform a hardware reset on all of the BMUs via the reset bus in response to a reset condition, and the reset condition comprises one of the BMUs preventing the BMS from receiving the heartbeat signal. In some embodiments, the reset condition further comprises the BMS attempting to communicate with the BMUs via the communication bus after one of the BMUs prevents the BMS from receiving the heartbeat signal. In some embodiments, the BMS is configured to apply a reset signal to the plurality of BMUs via the reset bus for a period of time. The reset signal is configured to shut off the BMUs. In some embodiments, the period of time during which BMS applies the reset signal lasts until after the BMS receives an indication that all of the BMUs have been reset. In some embodiments, the period of time during which BMS applies the reset signal lasts until a predetermined amount of delay time after the BMS receives an indication signal via the reset bus that all of the BMUs have been reset.

In yet another aspect of the present invention, a method of handling a fault in a battery pack is provided. The method comprises a battery module supplying a voltage to a high-voltage circuit, a BMS transmitting a heartbeat signal to the battery module via a fault bus, the battery module preventing the heartbeat signal from being transmitted back to the BMS in response to the battery module detecting a critical condition, and the BMS shutting off the supply of voltage from the battery module to the high-voltage circuit in response to the battery module preventing the heartbeat signal from being transmitted back to the BMS. In some embodiments, the high-voltage circuit incorporated into a vehicle.

In some embodiments, the critical condition comprises one of overcharging a battery cell, over-discharging a battery cell, an isolation fault, a short-circuit, over-current, over-temperature, or over-power. In some embodiments, preventing the heartbeat signal from being transmitted back to the BMS is performed using an open-collector, an open-drain transistor, a diode, or a relay.

In some embodiments, the method further comprises the battery module transmitting battery data to the BMS via a communication bus, wherein the communication bus is distinct from the fault bus, and the BMS transmitting one or more commands to the battery module via the communication bus. In some embodiments, the communication bus is a CAN-bus. In some embodiments, the battery data comprises information related to at least one of a remaining charge, a rate of discharge, a rate of charge, temperature, maximum cell-voltage, minimum cell-voltage, current state-of-charge, or current state-of-health. In some embodiments, the one or more commands comprises a command for the battery module to open or close a contactor for a battery. In some embodiments, the method further comprises the BMS communicating with the battery module via the communication bus to discover the critical condition in response to the battery module preventing the heartbeat signal from being transmitted back to the BMS. In some embodiments, the battery module comprises a plurality of battery stacks, a plurality of BMUs, and a HVFE unit. Each battery stack comprises a plurality of batteries that supply a voltage to the high-voltage circuit. Each BMU corresponds to and is coupled to a distinct battery stack in the plurality of battery stacks, and each BMU monitors data about the plurality of batteries in the corresponding battery stack. The HVFE unit is coupled to the plurality of BMUs. The HVFE unit receives and processes the data about the plurality of batteries. In some embodiments, the HVFE unit processes the received data to produce calculated battery information, and the HVFE unit transmits the calculated battery information to the BMS via the communication bus.

In some embodiments, a reset bus is coupled between the BMS and the plurality of BMUs. The reset bus is distinct from the communication bus, and the BMS performs a hardware reset on all of the BMUs via the reset bus. In some embodiments, the BMS performs a hardware reset on all of the BMUs via the reset bus in response to a reset condition. The reset condition comprises one of the BMUs preventing the BMS from receiving the heartbeat signal. In some embodiments, the reset condition further comprises the BMS attempting to communicate with the BMUs via the communication bus after one of the BMUs prevents the BMS from receiving the heartbeat signal. In some embodiments, the BMS applies a reset signal to the plurality of BMUs via the reset bus for a period of time. The reset signal shuts off the BMUs. In some embodiments, the period of time during which BMS applies the reset signal lasts until after the BMS receives an indication that all of the BMUs have been reset. In some embodiments, the period of time during which BMS applies the reset signal lasts until a predetermined amount of delay time after the BMS receives an indication signal via the reset bus that all of the BMUs have been reset.

BRIEF DESCRIPTION OF THE DRAWINGS

Various embodiments will be better understood from a reading of the following detailed description taken in conjunction with the drawings in which like reference designators are used to designate like elements, and in which:

FIG. 5 illustrates yet another embodiment of a battery pack fault communication and handling system in accordance with the principles of the present invention.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that certain method steps of the invention can be performed in alternative sequences to those disclosed in the flowcharts. Accordingly, the scope of the claims should not be limited to any specific order of method steps unless the order is required by the language of the claims.

Figure 1A:
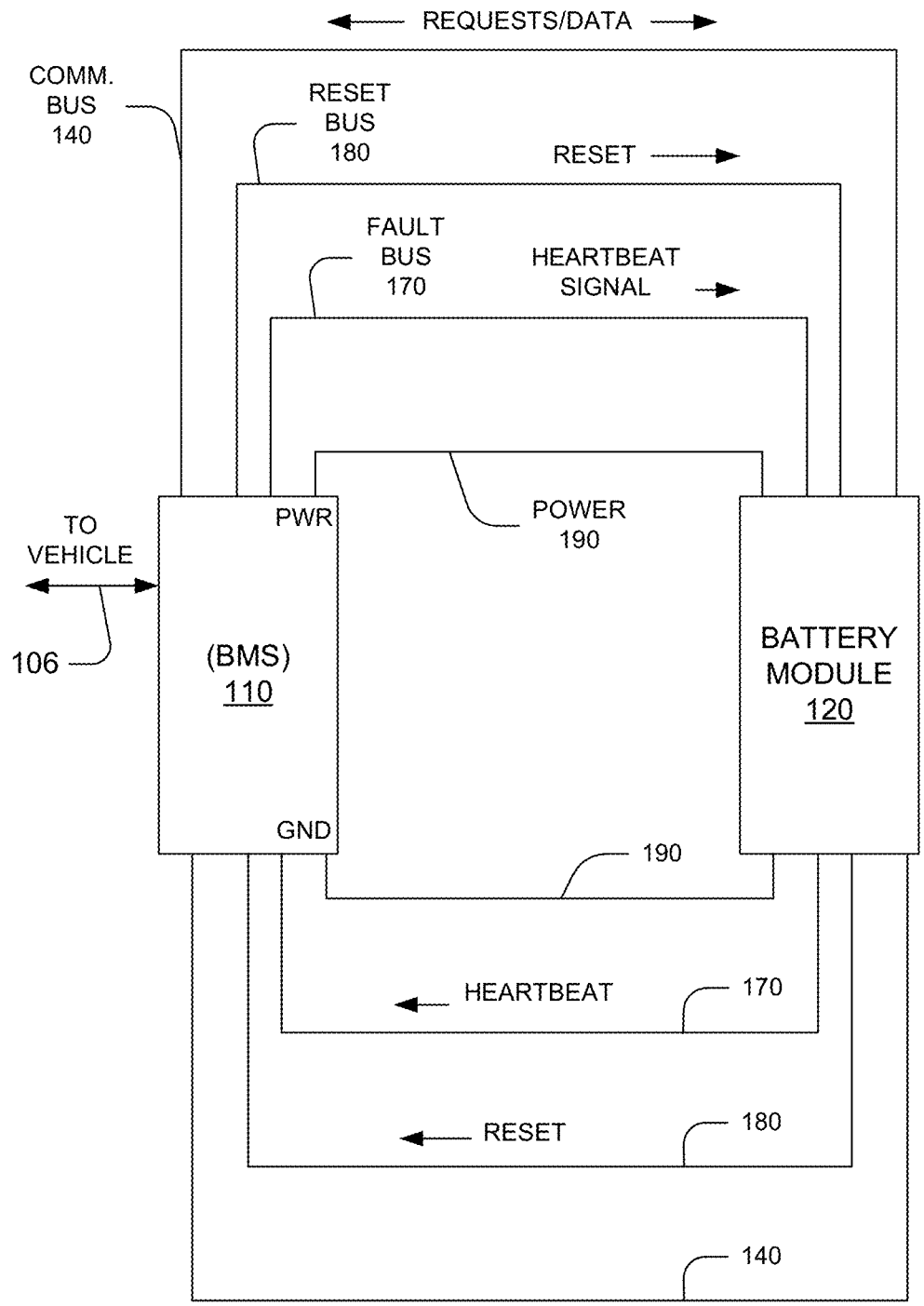
FIG. 1A illustrates one embodiment of a battery pack fault communication and handling system in accordance with the principles of the present invention.
Figure 1B:
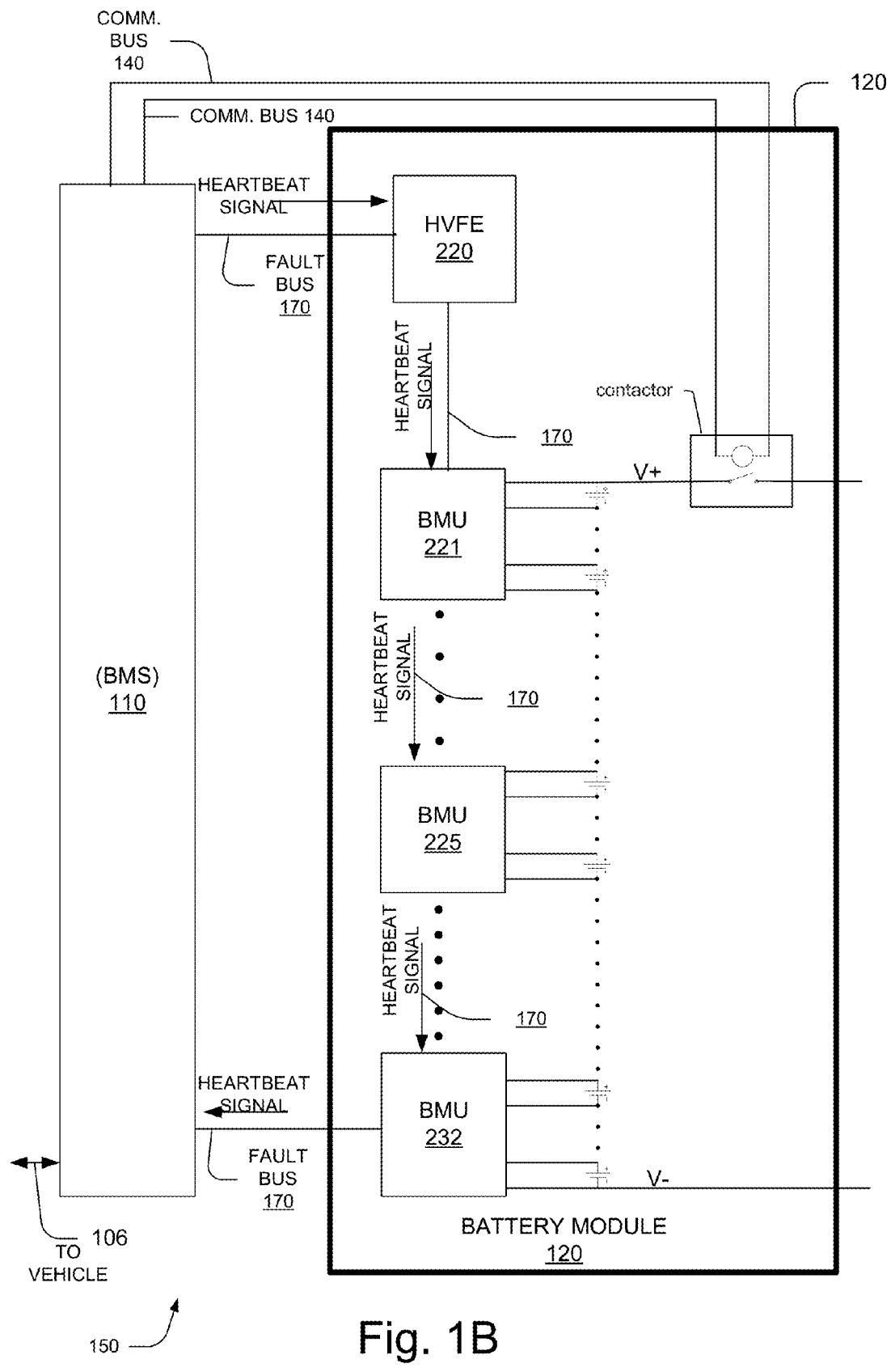
FIG. 1B illustrates another embodiment of a battery pack fault communication and handling system in accordance with the principles of the present invention.
Figure 2A:
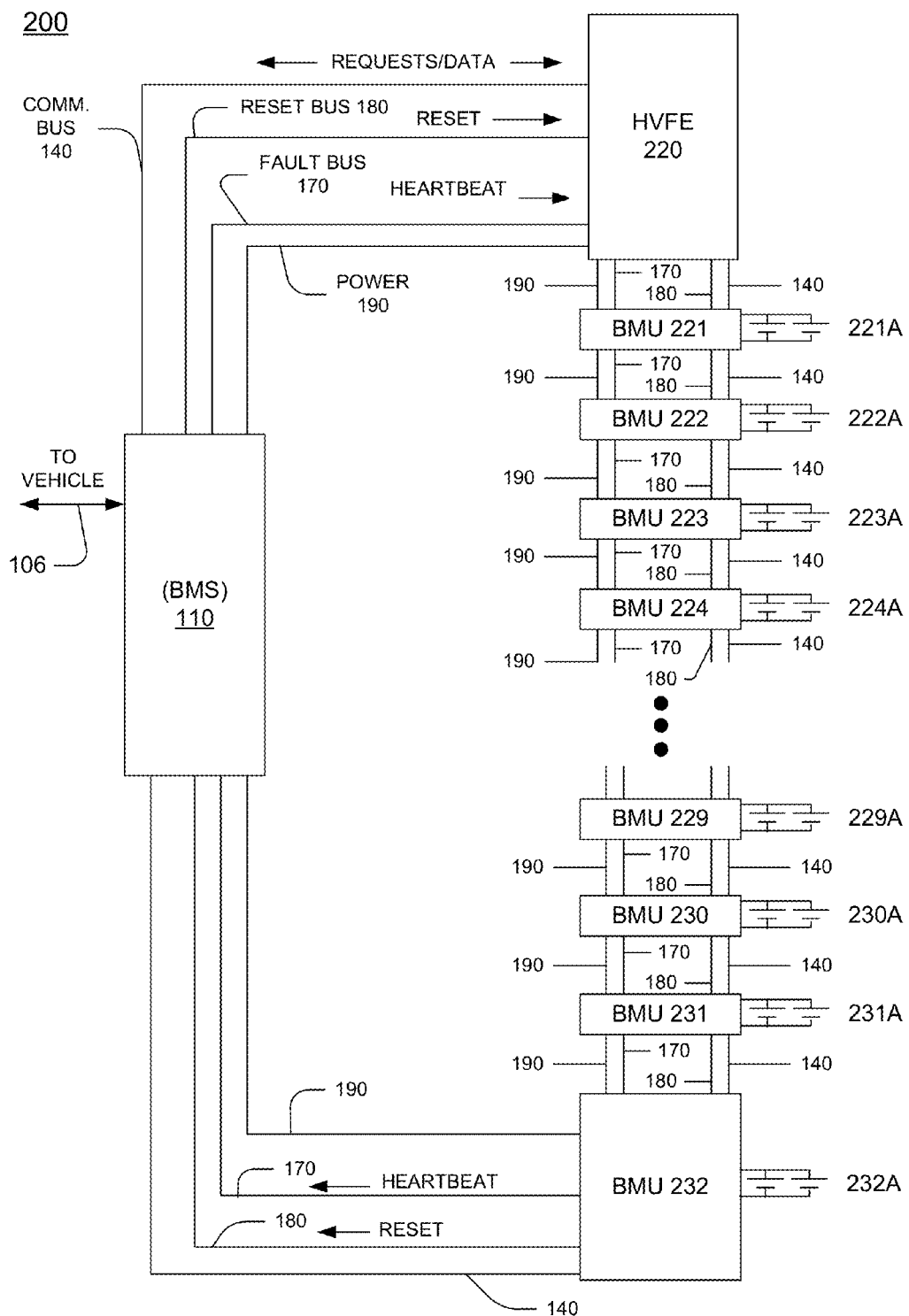
FIG. 2A illustrates another embodiment of a battery pack fault communication and handling system in accordance with the principles of the present invention.
Figure 2B:
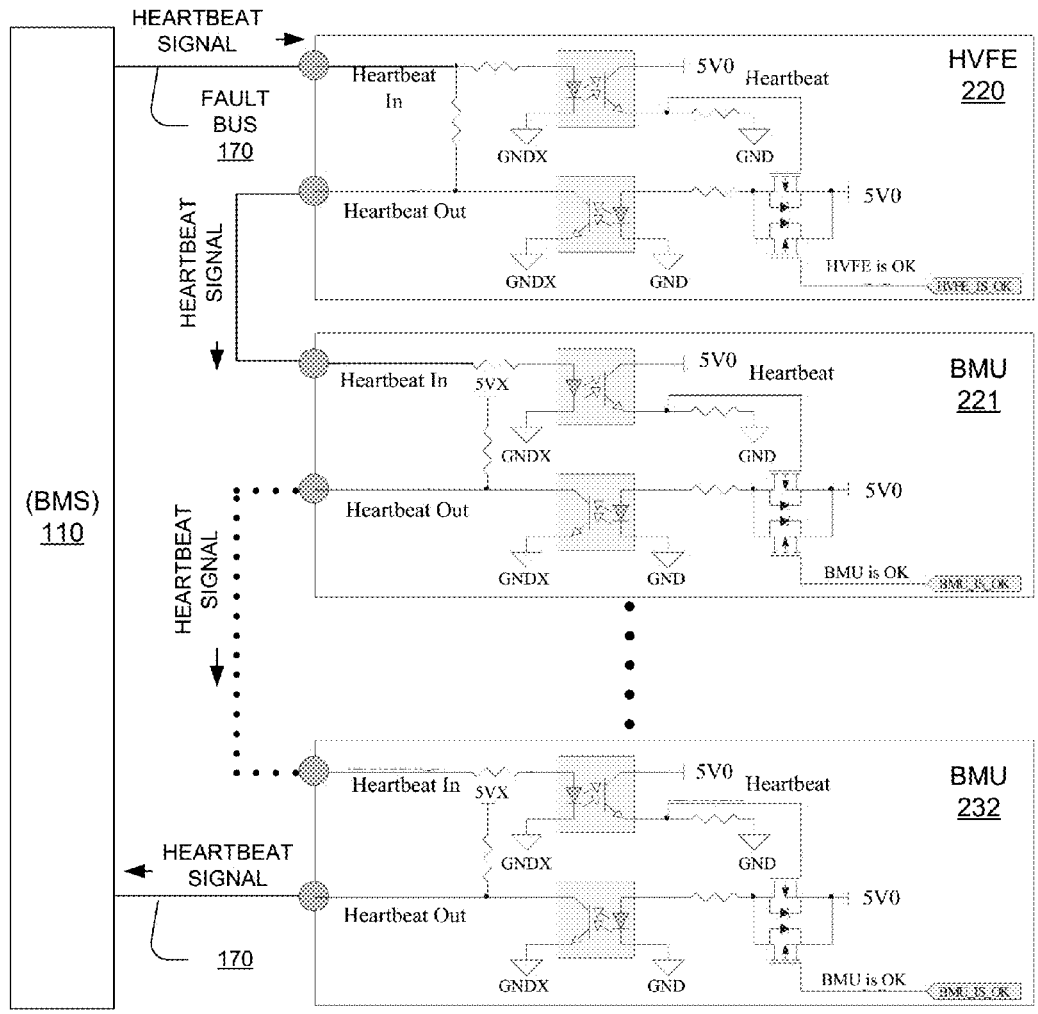
FIG. 2B illustrates another embodiment of a battery pack fault communication and handling system in accordance with the principles of the present invention.

FIGS. 1-2 illustrate embodiments of a battery pack fault communication and handling system, with like elements being numbered alike. FIG. 1 illustrates a system 100 for monitoring and managing batteries in an electric vehicle in accordance with the principles of the present invention. The system 100 comprises a Battery-Management-System (BMS) 110 in communication with a battery module 120. The battery module 120 comprises at least one battery and is configured to supply a voltage to a high-voltage circuit. In some embodiments, such as will be discussed in further detail below with respect to FIG. 2, the battery module 120 includes a plurality of battery stacks, a plurality of Battery-Monitoring-Units (BMUs), and a High-Voltage-Front-End (HVFE) unit. In some embodiments, a power bus 190 is coupled between the BMS 110 and the battery module 120, preferably providing a line for both power (PWR) and ground (GND).

The BMS 110 communicates with the battery module 120 via a communication bus 140. In some embodiments, the communication bus 140 is part of a Controller-Area-Network (CAN) 150. CAN is a bus standard designed to allow microcontrollers and devices to communicate with each other within a vehicle without a host computer. CAN is a message based protocol, designed for automotive applications, as well as industrial automation and medical equipment. Advantageously, the CAN 150 enables the system 100 as a hardware-oriented system, providing a quasi real-time link between controllers to allow for a distributed control system. In some embodiments, the BMS 110 sends commands to and requests information from components in the battery module 120, such as the HVFE unit and the BMUs, via the communication bus 140. Additionally, in some embodiments, the communication bus 140 is used to send battery data from the battery module 120 to the BMS 110, as will be discussed in further detail below with respect to FIG. 2. Furthermore, in some embodiments, commands and requests are also sent from one or more of the battery module components to the BMS 110, while data is sent from the BMS 110 to one or more of the battery module components. For example, a BMU or HVFE unit can request a new program image. In this case, the request would be issued from the BMU/HVFE unit and the data (i.e., program image) would be sent from the BMS 110. Other examples include the transmission of configuration tables or other data from the BMS 110 to a BMU/HVFE unit and requests for assignment of dynamic bus identifications from a BMU/HVFE unit to the BMS 110.

In some embodiments, the battery module 120 is configured to measure the voltage of a particular stack of batteries or to measure the entire voltage of several or all of the stacks of batteries in the battery module 120. In some embodiments, the battery module 120 comprises intelligence, such as a microprocessor and memory that holds a look-up table for relation of remaining coulombs of charge in the batteries and the output voltage, and can therefore output a total remaining distance or time that an electric vehicle has left. In some embodiments, the intelligence is additionally or alternatively disposed on board the BMS 110 or elsewhere in the electric vehicle. In some embodiments, an additional bus line 160 is provided as part of the CAN 150 and electrically couples the BMS 110 with the electric vehicle (not shown).

The present invention provides a fault bus 170 that couples the BMS 110 with the battery module 120. In a preferred embodiment, the fault bus 170 is an isolated bus. In some embodiments, such as shown in FIG. 1, the fault bus 170 couples the BMS 110 with the battery module 120 in a loop. The BMS 110 generates a heartbeat signal, which is transmitted to the battery module 120 and back to the BMS 110 via the fault bus 170. As long as there are no serious problems, the battery module 120 allows the heartbeat signal to continue on back to the BMS 110. However, if a critical problem arises, then the battery module 120 prevents the heartbeat signal from returning to the BMS 110. Such critical issues include, but are not limited to, over-charging a battery cell, over-discharging a battery cell, an isolation fault between a battery and the chassis (e.g., a battery touching the chassis), a short-circuit, over-current, over-temperature, or over-power. In some embodiments, certain issues such as a battery being over-temperature are not deemed critical. In some embodiments, the battery module 120 terminates the heartbeat signal using an open-collector, an open-drain transistor, a diode, or a relay. However, it is contemplated that the heartbeat signal can be stopped in other ways as well. In response to not receiving the heartbeat signal back from the battery module 120, such as after a predetermined amount of time, the BMS 110 automatically shuts off the supply of voltage from the battery module 120 to the high-voltage circuit of the vehicle, thereby cutting the high-voltage circuit down without using any software. In this way, the present invention provides a reliable solution to fault handling that is completely independent of the firmware. One benefit of using a heartbeat instead of a solid signal is that a short in the line, which could hold a signal line either high or low, could be detected by the BMS, since the signal would not change. A loop or ring embodiment has the further benefit of allowing the BMS to drive this heartbeat/fault signal at the beginning of the bus and sampling it at the end of the bus in order to detect a broken or open bus condition. Since the heartbeat is regular, even intermittent noise on the line couldn't be mistaken for valid heartbeat signals. It is envisioned that the heartbeat signal be a square wave. However, other regular waveforms (e.g., triangle, sawtooth, sinewave) could also be used.

The present invention is hardware-centric, implementing all of the critical functionality in hardware, whereas the prior art is heavily dependent on microprocessors and operating systems and requires a lot of firmware engineering to implement. In a preferred embodiment, the heartbeat/fault bus is implemented entirely in hardware, with the module faults being latched on any desired fault conditions, and the BMS would act on any bus fault in hardware as well in order to take the appropriate action(s), such as opening all contactors (i.e., disconnect the high-voltage bus from the system).

After the voltage supply is shut off, the BMS 110 can then try to determine what happened. In some embodiments, the BMS 110 communicates with the battery module 120 via the communication bus 140, by pinging different BMUs to discover the specific problem that caused the heartbeat bus fault.

FIG. 2 illustrates another embodiment of a system 200 for monitoring and managing batteries in an electric vehicle in accordance with the principles of the present invention. The system 200 is very similar to system 100, having similar components and structure. However, system 200 provides a more detailed view of the battery module 120 shown in FIG. 1. Here the battery module comprises a HVFE unit 220, BMUs 221-232, and battery modules 221A-232A.

System 200 comprises BMS 110 in communication with several external modules. Each module is in communication with at least some of the full complement of battery packs available on the electric vehicle. The communication with the modules is enabled by communication bus 140, preferably as part of a CAN.

The first of the external modules communicating with the BMS 110 is HVFE 220. In series with the HVFE 120 are a plurality of BMUs 221-232. Each BMU 231-232 is electrically coupled to a battery module 221A-232A. For example, the first BMU 221 is electrically coupled to a stack of batteries 221A. In the embodiment shown, the stack of batteries 221A has four batteries. In other embodiments, the BMU 221 has ports to electrically couple to 12 batteries. It is contemplated that other battery cell numbers and configurations are within the scope of the present invention. The BMUs 221-232 monitor the battery modules 221A-232A. In some embodiments, the BMUs are configured to sense various battery module conditions, such as cell-group voltage, temperature, current, and other useful data of each stack and to report the data to the BMS 110. The HVFE 220 is electrically coupled to all battery stacks 221A-232A and is able to measure parameters like the total current, voltage, and power either produced or received by the battery modules 221A-232A. The BMUs 221-232 are each configured for measuring the voltage of the stack of batteries that the BMU is electrically coupled to, on the order of 1-10V for each stack of batteries. The HVFE 220 is configured to measure the entire voltage of all battery stacks 221A-232A, on the order of 320V in some embodiments. The HVFE 220 is then able to perform a current integration to calculate the total discharge and charge from the battery modules 221A-232A in coulombs to determine the remaining charge relative to the total output voltage that the HVFE 220 is measuring. In some embodiments, the HVFE 220 comprises intelligence, such as a microprocessor and memory that holds a look up table for relation of remaining coulombs of charge in the batteries and the output voltage, and can therefore output a total remaining distance or time that the electric vehicle. Alternatively, the intelligence is on board the BMS 110 or elsewhere in the electric vehicle. The CAN 150 comprises a second bus line 160 that electrically couples the BMS 110 with the electric vehicle (not shown). The BMS 110 can send battery data to a vehicle display (not shown) and instructions and data can be sent to the BMUs 221-232 from the electric vehicle. For example, the electric vehicle may ping the BMS 110 to retrieve battery data from the BMUs 221-232. Alternatively, an instruction can require the BMUs 221-232 to continually broadcast their status.

System 200 operates using the same principles as system 100. The BMS sends the heartbeat signal to the BMUs, with the heartbeat signal propagating through the entire loop. Each BMU board is configured to terminate the heartbeat signal if a critical issue arises. For example, if BMU 223 runs into a problem, such as a over-charging, it terminates the heartbeat signal. In some embodiments, each BMU board has an open-collector, an open-drain transistor, a diode, or a relay that can be used to terminate the heartbeat signal. As a result of the heartbeat signal being terminated, the BMS then knows to cut the voltage to the high-voltage circuit. The BMS can then ping each BMU processor to discover what happened.

Figure 3:
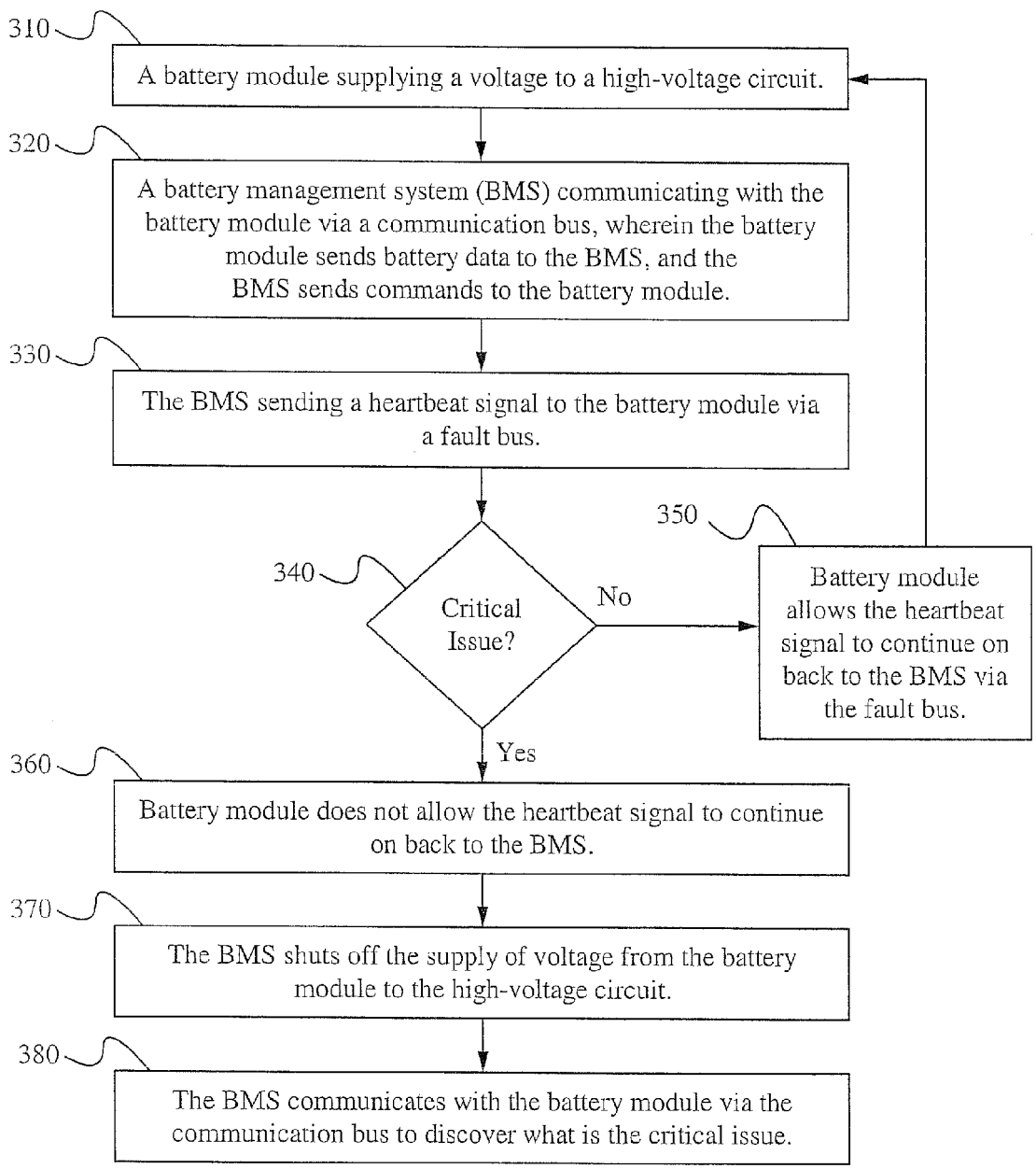
FIG. 3 illustrates one embodiment of a method of battery pack fault communication and handling in accordance with the principles of the present invention.

FIG. 3 illustrates one embodiment of a method 300 of battery pack fault communication and handling in accordance with the principles of the present invention.

At step 310, a battery module, such as the battery module discussed above with respect to FIGS. 1-2, supplies a voltage to a high-voltage circuit. In some embodiments, the battery module includes a plurality of battery stacks, with each battery stack comprising a plurality of batteries.

At step 320, a BMS communicates with the battery module via a communication bus. The battery module sends battery data to the BMS. In some embodiments, this battery data is obtained, processed, and/or produced using the BMUs and the HVFE unit discussed above. The BMS sends one or more commands to the battery module. In some embodiments, the BMS sends a command for the battery module to open or close a contactor for one or more batteries. In some embodiments, the communication bus is a CAN bus.

At step 330, the BMS sends a heartbeat signal to the battery module via a fault bus. The fault bus is distinct from the communication bus. This heartbeat signal is repeatedly sent in order for the BMS to determine if there is a problem in the battery module.

At step 340, it is determined whether or not there is a critical issue that requires shutting off the high-voltage circuit. Such critical issues include, but are not limited to, over-charging of a battery cell, over-discharging of a battery cell, an isolation fault, a short-circuit, over-current, over-temperature, or over-power.

If it is determined that there is not a critical issue, then the method proceeds to step 350, where the battery module allows the heartbeat signal to continue on back to the BMS. As a result of the BMS receiving the heartbeat signal, the BMS allows the battery module to continue supplying a voltage to the high-voltage circuit, repeating at step 310.

If it is determined that there is a critical issue, then the method proceeds to step 360, where the battery module prevents the heartbeat signal from continuing on back to the BMS. In some embodiments, the battery module prevents the heartbeat signal from being transmitted back to the BMS by using an open-collector, an open-drain transistor, a diode, or a relay.

At step 370, in response to the battery module preventing the heartbeat signal from being transmitted back to the BMS, the BMS shuts off the supply of voltage from the battery module to the high-voltage circuit. In some embodiments, the BMS expects to receive the heartbeat signal within a predetermined amount of time. When this predetermined amount of time elapses without the BMS receiving the heartbeat signal, it then proceeds with shutting off the high-voltage circuit. In some embodiments, the BMS shuts off the supply of voltage to the high-voltage circuit by sending a command for the battery module to open or close a contactor for one or more batteries. In some embodiments, this command is sent via the communication bus.

At step 380, the BMS communicates with the battery module via the communication bus in order to discover what the problem is that caused the supply of voltage to be shut off. In some embodiments, such communication comprises the BMS pinging the battery module or the individual BMUs within the battery module. Corrective action can then be taken, and the process can be restarted, with the battery module once again supplying a voltage to the high-voltage circuit and the BMS managing any faults that may arise.

In certain situations, it may be useful to perform a hardware reset of all of the BMUs. For example, if hardware in one or more of the BMUs gets latched, such as in an ESD event, ordinarily the BMUs would have to be unplugged and then plugged back in so that they could be reset. However, unplugging and plugging components is difficult to perform effectively in a battery pack. Instead, the present invention provides one main controller, in the form of the BMS, that can force each BMU to perform a full hardware reset and that can monitor the status of the reset. This hardware reset provides a useful fault management redundancy in the system.

In a preferred embodiment, the full hardware reset of the present invention is performed via a reset bus 180, such as shown in FIGS. 1-2. The reset bus 180 provides a line from the BMS to the BMUs and from the BMUs back to the BMS, over which the BMS can assert a reset signal on the BMUs and then receive the status of the reset. For example, in FIG. 2, the BMS 110 asserts a reset signal (shown exiting the BMS 110 from the top side) on reset bus 180, which gets transmitted to BMUs 221-232. As the reset signal gets asserted on each BMU, it drives a reset on each BMU, switching internal components of the BMU, allowing them to discharge. In some embodiments, the reset signal drives a switch that disconnects a BMU from its battery cells and a resistor on the BMU board is used to quickly discharge the BMU. The BMS 110 monitors the status of the hardware reset by examining the returning signal on the reset bus 180. Eventually, the signal returning to the BMS 110 on the reset bus 180 indicates that the reset signal has reached each BMU 221-232. For example, in some embodiments, while the reset signal is being asserted by BMU 110 on bus 180, the signal coming back to the BMS 110 (shown entering the BMS 110 from the bottom side) stays at a certain level until the reset signal has driven a shut down of each BMU, at which point, the returning signal changes (either from low to high or from high to low). In some embodiments, after the returning signal changes, the BMS 110 implements a fixed delay, waiting for a predetermined amount of time before de-asserting the reset signal on the reset bus 180. After the BMS 110 de-asserts the reset signal, the BMUs 221-232 start up again. The fixed delay is employed by the BMS 110 to allow the BMU boards to completely discharge and to ensure a good hardware reset.

Figure 4:
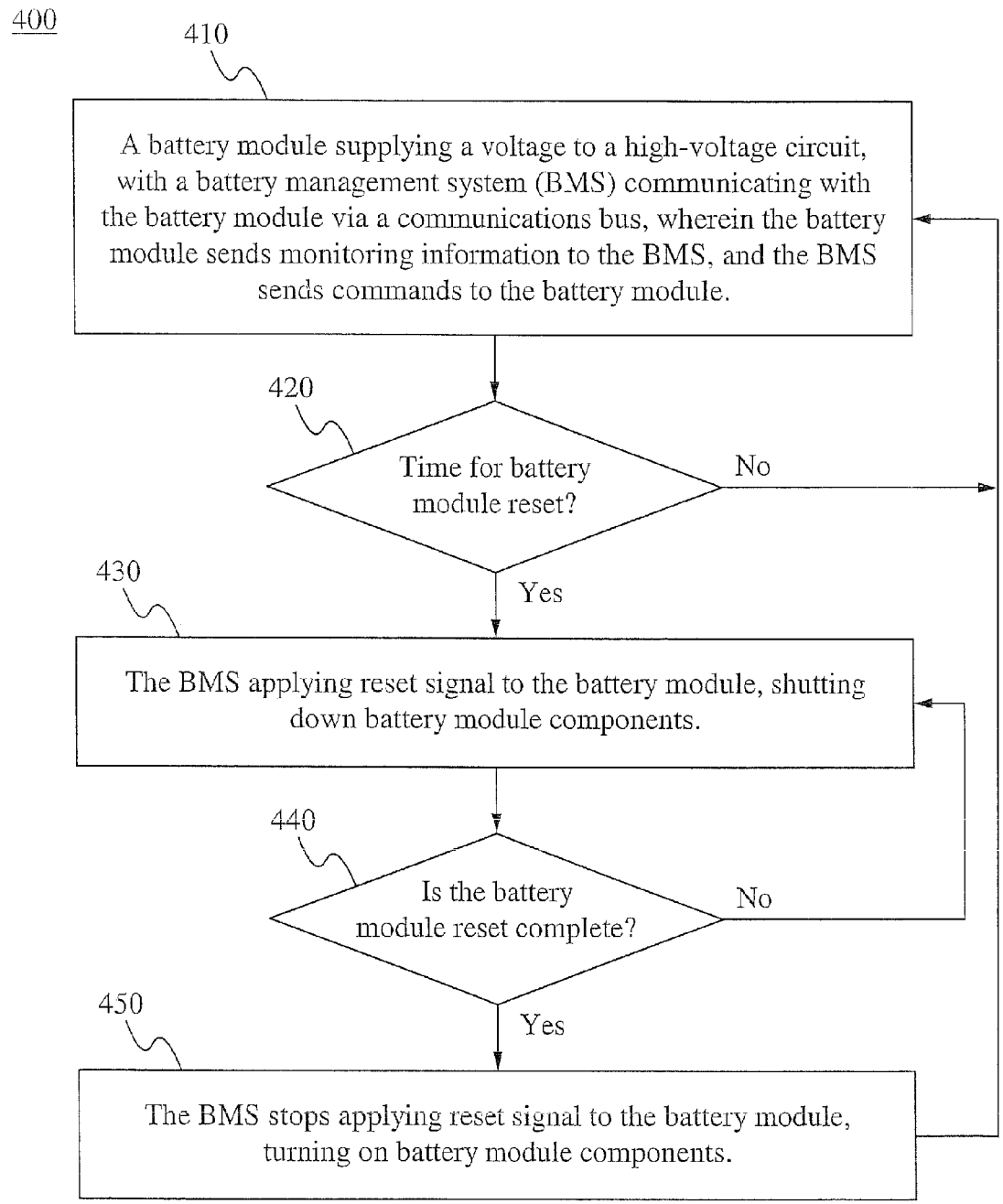
FIG. 4 illustrates one embodiment of a method of battery pack fault management in accordance with the principles of the present invention.

FIG. 4 illustrates one embodiment of a method 400 of battery pack fault management in accordance with the principles of the present invention.

At step 410, a battery module, such as the battery module discussed above with respect to FIGS. 1-2, supplies a voltage to a high-voltage circuit. In some embodiments, the battery module includes a plurality of battery stacks, with each battery stack comprising a plurality of batteries, and a corresponding BMU for each battery stack. A BMS communicates with the battery module via a communication bus. The battery module sends battery data to the BMS. In some embodiments, this battery data is obtained, processed, and/or produced using the BMUs and the HVFE unit discussed above. The BMS sends one or more commands to the battery module. In some embodiments, the BMS sends a command for the battery module to open or close a contactor for one or more batteries. In some embodiments, the communication bus is a CAN bus.

At step 420, the BMS determines whether or not it is time for a battery module reset. In some embodiments, a battery module reset is initiated by the BMS not receiving the heartbeat signal back within an expected time period. In some embodiments, a battery module reset is initiated by the BMS making a determination that a full hardware reset is required after investigating one or more BMUs in response to not receiving the heartbeat signal back within an expected time period. It is contemplated that the battery module reset can be initiated by other conditions as well. In some embodiments, the battery module reset is initiated independently from a determination of whether or not the BMS has received the heartbeat signal back within an expected time period. If the BMS determines that it is not time for a battery module reset, then it continues to allow the battery module to operate as usual back at step 410.

If the BMS determines that it is time for a battery module reset, then the process proceeds to step 430, where the BMS applies a reset signal to the battery module via a reset bus, thereby shutting down certain battery modules components. In a preferred embodiment, the BMS asserts the reset signal to shut down all of the BMUs.

At step 440, the BMS determines whether the battery module has been completely reset. In a preferred embodiment, the BMS determines whether all of the BMUs been shut off. In some embodiments, the BMS makes this determination by monitoring the return signal on the reset bus, as previously discussed. In some embodiments, the BMS can also incorporate a fixed delay into its determination of whether all of the BMUs have been shut off, as previously discussed. If the BMS determines that the battery module reset is not complete (i.e., not all of the BMUs have been shut down), then it continues, at step 430, to assert the reset signal.

If the BMS determines that the battery module reset is complete (i.e., all of the BMUs have been shut down), then it proceeds to step 450, where the BMS stops applying the reset signal to the battery module, thereby allowing the battery module components to turn back on. At this point, the full hardware reset of the BMUs has been completed and the system continues to operate as usual back at step 410.

FIG. 5 illustrates yet another embodiment of a battery pack fault communication and handling system 500 in accordance with the principles of the present invention. System 500 is similar to system 200 in FIG. 2, except that instead of the BMS 110 and the BMUs 221-232 being coupled in a loop, the BMS 110 is coupled to the BMUs 221-232 in a parallel bus configuration via communication bus 540, fault bus 570, reset bus 580, and power bus 590. Communication bus 540, fault bus 570, reset bus 580, and power bus 590 can each enable the same communications and functions as their respective corresponding busses 140, 170, 180, and 190 in FIGS. 1-2.

Although busses 140, 170, 180, 190, 540, 570, 580, and 590 are each represented by a single line, it is contemplated that each one can comprise one or more conductors. For example, in some embodiments, fault bus 170 comprises two conductors: one conductor for the BMS to transmit the heartbeat signal to the battery module and one conductor for the BMS to receive the heartbeat signal after it has returned from the battery module. Similarly, in some embodiments, the reset bus 180 comprises two conductors: one conductor for the BMS to assert the reset signal on the BMUs and one conductor to receive a return signal and monitor the status of the battery module hardware shut down. Accordingly, it is contemplated that each bus can comprise 1 to N number of conductors, with N being any number desired or appropriate for a particular embodiment.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A battery pack fault communication and handling system comprising:
   a battery module comprising at least one battery, wherein the battery module is configured to supply a voltage to a high-voltage circuit;
   a fault bus; and
   a Battery Management System (BMS) coupled to the battery module via the fault bus, wherein the BMS is configured to transmit a heartbeat signal to the battery module via the fault bus and to receive the heartbeat signal back from the battery module via the fault bus, and wherein the BMS is configured to shut off the supply of voltage from the battery module to the high-voltage circuit in response to the battery module preventing the BMS from receiving the heartbeat signal.

2. The system of claim 1, wherein:
   the battery module, the fault bus, and the BMS form a loop;
   the BMS and the battery module are configured to pass the heartbeat signal through the loop;
   the battery module is configured to prevent the heartbeat signal from returning to the BMS in response to detection of a critical condition.

3. The system of claim 2, wherein the critical condition comprises one of over-charging a battery cell, over-discharging a battery cell, an isolation fault, a short-circuit, over-current, over-temperature, or over-power.

4. The system of claim 2, wherein the battery module is configured to prevent the heartbeat signal from returning to the battery management system using an open-collector or open-drain transistor.

5. The system of claim 1, further comprising a communication bus distinct from the fault bus, wherein the BMS is coupled to the battery module via the communication bus, the battery module is configured to transmit battery data to the BMS via the communication bus, and the BMS is configured to transmit one or more commands to the battery module via the communication bus.

6. The system of claim 5, wherein the communication bus is a Controller-Area-Network (CAN) bus.

7. The system of claim 5, wherein the battery data comprises information related to at least one of the at least one battery's remaining charge, rate of discharge, rate of charge, maximum cell voltage, minimum cell voltage, current state-of-charge, current state-of-health, or temperature.

8. The system of claim 5, wherein the one or more commands comprises a command for the battery module to open or close a contactor for the at least one battery.

9. The system of claim 5, wherein the BMS is configured to ping the battery module via the communication bus in response to the battery module preventing the BMS from receiving the heartbeat signal.

10. The system of claim 5, wherein the battery module comprises:
    a plurality of battery stacks, each battery stack comprising a plurality of batteries configured to supply a voltage to the high-voltage circuit;
    a plurality of Battery-Monitoring-Units (BMUs), wherein each BMU corresponds to and is coupled to a distinct battery stack in the plurality of battery stacks, and each BMU is configured to monitor data about the plurality of batteries in the corresponding battery stack; and
    a High-Voltage-Front-End (HVFE) unit coupled to the plurality of BMUs and configured to receive and process the data about the plurality of batteries.

11. The system of claim 1, wherein the high-voltage circuit is incorporated into a vehicle.

12. A battery pack fault communication and handling system comprising:
    a plurality of battery stacks, each battery stack comprising a plurality of batteries configured to supply a voltage to a high-voltage circuit;
    a plurality of Battery-Monitoring-Units (BMUs), wherein each BMU corresponds to and is coupled to a distinct battery stack in the plurality of battery stacks, and each BMU is configured to monitor data about the plurality of batteries in the corresponding battery stack;
    a communication bus;
    a fault bus distinct from the communication bus; and
    a Battery-Management-System (BMS) coupled to the plurality of BMUs via the communication bus and via the fault bus, wherein the BMS is configured to receive battery data from the plurality of BMUs and to send one or more commands to the plurality of BMUs via the communication bus, wherein the BMS is configured to send a heartbeat signal to the plurality of BMUs via the fault bus and to receive the heartbeat signal back from the BMUs via the fault bus, and wherein the BMS is configured to shut off the supply of voltage from the battery stacks to the high-voltage circuit in response to one of the BMUs preventing the BMS from receiving the heartbeat signal.

13. The system of claim 12, wherein the data about the plurality of batteries includes at least one of current, voltage, temperature, maximum cell-voltage, minimum cell-voltage, current state-of-charge, and current state-of-health.

14. The system of claim 12, further comprising a High-Voltage-Front-End (HVFE) unit coupled to the BMS and to the plurality of BMUs, wherein the HVFE unit is configured to receive the data about the plurality of batteries from each BMU and to process the received data.

15. The system of claim 14, wherein the HVFE unit is configured to:
    process the received data to produce calculated battery information; and
    transmit the calculated battery information to the BMS.

16. The system of claim 14 wherein:
   the plurality of BMUs, the HVFE unit, the fault bus, and the BMS form a loop;
   the BMS, the HVFE, and the BMUs are configured to pass the heartbeat signal through the loop;
   the plurality of BMUs is configured to prevent the heartbeat signal from returning to the BMS in response to detection of a critical condition.

17. The system of claim 16, wherein the critical condition comprises one of over-charging a battery cell, over-discharging a battery cell, an isolation fault, a short-circuit, over-current, over-temperature, or over-power.

18. The system of claim 16, wherein the plurality of BMUs is configured to prevent the heartbeat signal from returning to the BMS using an open-collector or an open-drain transistor.

19. The system of claim 12, wherein the communication bus is a Controller-Area-Network (CAN) bus.

20. The system of claim 12, wherein the one or more commands comprises a command to open or close a contactor for at least one of the batteries.

21. The system of claim 12, wherein the BMS is configured to ping the BMUs via the communication bus in response to one of the BMUs preventing the BMS from receiving the heartbeat signal.

22. The system of claim 12, further comprising a reset bus coupled between the BMS and the plurality of BMUs, wherein the reset bus is distinct from the communication bus, and wherein the BMS is configured to perform a hardware reset on all of the BMUs via the reset bus.

23. The system of claim 22, wherein the BMS is configured to perform a hardware reset on all of the BMUs via the reset bus in response to a reset condition, wherein the reset condition comprises one of the BMUs preventing the BMS from receiving the heartbeat signal.

24. The system of claim 23, wherein the reset condition further comprises the BMS attempting to communicate with the BMUs via the communication bus after one of the BMUs prevents the BMS from receiving the heartbeat signal.

25. The system of claim 22, wherein the BMS is configured to apply a reset signal to the plurality of BMUs via the reset bus for a period of time, wherein the reset signal is configured to shut off the BMUs.

26. The system of claim 25, wherein the period of time during which BMS applies the reset signal lasts until after the BMS receives an indication that all of the BMUs have been reset.

27. The system of claim 25, wherein the period of time during which BMS applies the reset signal lasts until a predetermined amount of delay time after the BMS receives an indication signal via the reset bus that all of the BMUs have been reset.

28. A method of handling a fault in a battery pack, the method comprising:
   a battery module supplying a voltage to a high-voltage circuit;
   a Battery-Management-System (BMS) transmitting a heartbeat signal to the battery module via a fault bus;
   the battery module preventing the heartbeat signal from being transmitted back to the BMS in response to the battery module detecting a critical condition; and
   the BMS shutting off the supply of voltage from the battery module to the high-voltage circuit in response to the battery module preventing the heartbeat signal from being transmitted back to the BMS.

29. The method of claim 28, wherein the critical condition comprises one of overcharging a battery cell, over-discharging a battery cell, an isolation fault, a short-circuit, or over-current.

30. The method of claim 28, wherein preventing the heartbeat signal from being transmitted back to the battery management system is performed using an open-collector or an open-drain transistor.

31. The method of claim 28, further comprising:
   the battery module transmitting battery data to the BMS via a communication bus, wherein the communication bus is distinct from the fault bus;
   the BMS transmitting one or more commands to the battery module via the communication bus.

32. The method of claim 31, wherein the communication bus is a CAN-bus.

33. The method of claim 31, wherein the battery data comprises information related to at least one of a remaining charge, a rate of discharge, a rate of charge, temperature, maximum cell-voltage, minimum cell-voltage, current state-of-charge, and current state-of-health.

34. The method of claim 31, wherein the one or more commands comprises a command for the battery module to open or close a contactor for a battery.

35. The method of claim 31, further comprising the BMS communicating with the battery module via the communication bus to discover the critical condition in response to the battery module preventing the heartbeat signal from being transmitted back to the BMS.

36. The method of claim 31, wherein the battery module comprises:
   a plurality of battery stacks, wherein each battery stack comprising a plurality of batteries that supply a voltage to the high-voltage circuit;
   a plurality of BMUs, wherein each BMU corresponds to and is coupled to a distinct battery stack in the plurality of battery stacks, and each BMU monitors data about the plurality of batteries in the corresponding battery stack; and
   a High-Voltage-Front-End (HVFE) unit coupled to the plurality of BMUs, wherein the HVFE unit receives and processes the data about the plurality of batteries.

37. The method of claim 36, wherein:
   the HVFE unit processes the received data to produce calculated battery information; and
   the HVFE unit transmits the calculated battery information to the BMS via the communication bus.

38. The method of claim 36, wherein a reset bus is coupled between the BMS and the plurality of BMUs, the reset bus is distinct from the communication bus, and the BMS performs a hardware reset on all of the BMUs via the reset bus.

39. The method of claim 38, wherein the BMS applies a reset signal to the plurality of BMUs via the reset bus for a period of time, wherein the reset signal shuts off the BMUs.

40. The method of claim 39, wherein the period of time during which BMS applies the reset signal lasts until after the BMS receives an indication that all of the BMUs have been reset.

41. The method of claim 39, wherein the period of time during which BMS applies the reset signal lasts until a predetermined amount of delay time after the BMS receives an indication signal via the reset bus that all of the BMUs have been reset.

42. The method of claim 38, wherein the BMS performs a hardware reset on all of the BMUs via the reset bus in response to a reset condition, wherein the reset condition comprises one of the BMUs preventing the BMS from receiving the heartbeat signal.

43. The method of claim 42, wherein the reset condition further comprises the BMS attempting to communicate with the BMUs via the communication bus after one of the BMUs prevents the BMS from receiving the heartbeat signal.

44. The method of claim 28, wherein the high-voltage circuit is incorporated into a vehicle.

* * * * *